US009369209B2

(12) United States Patent
Bernasconi (10) Patent No.: US 9,369,209 B2
(45) Date of Patent: Jun. 14, 2016

(54) FLEXIBLE OPTICAL MODULATOR FOR ADVANCED MODULATION FORMATS FEATURING ASYMMETRIC POWER SPLITTING

(71) Applicant: Alcatel-Lucent USA, Inc., Murray Hill, NJ (US)

(72) Inventor: Pietro Bernasconi, Genestrerio (CH)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/785,231

(22) Filed: Mar. 5, 2013

(65) Prior Publication Data

US 2013/0230320 A1    Sep. 5, 2013

Related U.S. Application Data

(60) Provisional application No. 61/606,590, filed on Mar. 5, 2012.

(51) Int. Cl.
*H04J 14/00* (2006.01)
*H04B 10/00* (2013.01)
*H04B 10/12* (2006.01)
*H04B 10/516* (2013.01)
*G02B 6/293* (2006.01)

(52) U.S. Cl.
CPC .......... *H04B 10/516* (2013.01); *G02B 6/29386* (2013.01)

(58) Field of Classification Search
USPC ............................................ 398/45, 140, 141
See application file for complete search history.

(56) References Cited

U.S. PATENT DOCUMENTS

| 5,596,661 | A | 1/1997 | Henry et al. | |
|---|---|---|---|---|
| 5,664,037 | A * | 9/1997 | Weidman | G02B 6/2856 385/43 |
| 6,263,125 | B1 * | 7/2001 | Nir | H04Q 11/0005 385/16 |
| 6,353,694 | B1 * | 3/2002 | Paiam | G02B 6/125 385/129 |
| 6,421,155 | B1 * | 7/2002 | Yano | H04B 10/25137 398/183 |
| 6,496,289 | B1 * | 12/2002 | Kuroyanagi | H04J 14/02 398/26 |

(Continued)

FOREIGN PATENT DOCUMENTS

| CN | 101055336 A | 10/2007 |
|---|---|---|
| EP | 1048971 A1 | 2/2000 |

(Continued)

OTHER PUBLICATIONS

Pierre Besse, New 2×2 and 1×3 Multimode Interference Couplers with Free Selection of Power Splitting Ratios, Journal of Lightwave Technology, vol. 14, Oct. 1996.*

(Continued)

*Primary Examiner* — David Payne
*Assistant Examiner* — Pranesh Barua
(74) *Attorney, Agent, or Firm* — Parker Justiss, PC (57) ABSTRACT

An apparatus comprising a first optical input coupler, having first and second input ports and first and second output ports. The optical input coupler can be configured to receive an optical input signal to the first input port. An optical power level ratio of a second optical output to first optical output transmitted from the second and the first output ports, respectively, equals about 2:1.

13 Claims, 6 Drawing Sheets

(56) References Cited

U.S. PATENT DOCUMENTS

| | | | |
|---|---|---|---|
| 6,571,038 B1* | 5/2003 | Joyner | G02B 6/2813 385/27 |
| 6,760,151 B1* | 7/2004 | Vail | H01S 3/005 359/334 |
| 7,236,708 B2 | 6/2007 | Shimada et al. | |
| 7,558,487 B2 | 7/2009 | Liu et al. | |
| 7,873,284 B2* | 1/2011 | Chen | H04B 10/505 398/183 |
| 2001/0024543 A1* | 9/2001 | Ahmadvand | G02B 6/29355 385/24 |
| 2002/0106143 A1* | 8/2002 | Doerr | G02B 6/12007 385/14 |
| 2003/0123878 A1* | 7/2003 | Li | G02B 6/29361 398/79 |
| 2003/0215173 A1* | 11/2003 | Hakimi | G02B 6/2706 385/15 |
| 2005/0100271 A1* | 5/2005 | Frankel | H04J 14/0204 385/24 |
| 2005/0238367 A1 | 10/2005 | Chen et al. | |
| 2005/0275921 A1* | 12/2005 | Haus | G02B 6/125 359/247 |
| 2005/0286896 A1* | 12/2005 | Kinoshita | H04J 14/0204 398/83 |
| 2006/0002704 A1* | 1/2006 | Jasti | H04B 10/032 398/12 |
| 2006/0093369 A1* | 5/2006 | Nagarajan | H04B 10/43 398/135 |
| 2006/0210273 A1* | 9/2006 | Gumaste | H04J 14/0204 398/83 |
| 2007/0071453 A1* | 3/2007 | Liu | H04B 10/505 398/183 |
| 2007/0098325 A1* | 5/2007 | Doerr | G02B 6/12021 385/45 |
| 2007/0104492 A1* | 5/2007 | Betts | H04B 10/505 398/183 |
| 2008/0075472 A1 | 3/2008 | Liu et al. | |
| 2008/0144989 A1* | 6/2008 | Sakurai | G02F 1/3132 385/3 |
| 2008/0181620 A1* | 7/2008 | Sasaki | H04B 10/5561 398/198 |
| 2010/0166427 A1* | 7/2010 | Jeong | G02B 6/12004 398/82 |
| 2010/0178056 A1 | 7/2010 | Liu | |
| 2010/0215374 A1 | 8/2010 | Liu et al. | |
| 2010/0290790 A1* | 11/2010 | Murthy | H04B 10/66 398/192 |
| 2010/0303469 A1* | 12/2010 | Barton | H04B 10/505 398/184 |
| 2011/0002696 A1* | 1/2011 | Kang | H04B 10/5053 398/175 |
| 2011/0150465 A1* | 6/2011 | Ito | H04B 10/532 398/43 |
| 2011/0222865 A1* | 9/2011 | Coelho | H04B 10/505 398/182 |
| 2011/0311217 A1* | 12/2011 | Horiuchi | H04J 14/0297 398/5 |
| 2012/0106888 A1* | 5/2012 | Goh | G02F 1/0327 385/3 |

FOREIGN PATENT DOCUMENTS

| | | | | |
|---|---|---|---|---|
| EP | 1048971 A1 * | 11/2000 | | G02B 6/122 |
| JP | 2003295136 A | 10/2003 | | |
| JP | 2010250125 A | 11/2010 | | |
| WO | 2012114777 A1 | 8/2012 | | |

OTHER PUBLICATIONS

Besse, P.A., et al., "New 2×2 and 1×3 Multimode Interface Couplers with Free Selection of Power Splitting Ratios", Journal of Lightwave Technology, vol. 14, Issue 10, pp. 2286-2293.

Tseng, Shou-Yen, et al, "Variable Splitting Ratio 2×2 MMI Couplers Using Multimode waveguide holograms", Optics Express, © 2007 Optical Society of America, 7 pgs.

* cited by examiner

FLEXIBLE OPTICAL MODULATOR FOR ADVANCED MODULATION FORMATS FEATURING ASYMMETRIC POWER SPLITTING

CROSS-REFERENCE TO RELATED APPLICATION

This application claims the benefit of U.S. Provisional Application Ser. No. 61/606,590, filed by Pietro Bernasconi on Mar. 5, 2012, entitled, "FLEXIBLE OPTICAL MODULATOR FOR ADVANCED MODULATION FORMATS," and is related to U.S. patent application Ser. No. 13/785,145 ('145 application) filed on Mar. 5, 2013, entitled, "FLEXIBLE OPTICAL MODULATOR FOR ADVANCED MODULATION FORMATS", both commonly assigned with this application and both incorporated herein by reference in their entirety.

TECHNICAL FIELD

This application is directed, in general, to optical communications systems and methods.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Conventional optical modulators using different advanced modulation formats are typically implemented using discrete different components configured to perform one form of optical modulation. However, these discrete components can be bulky and expensive, and, mechanically unstable and difficult to control, when assembled in a final package (e.g., when mounted on a same circuit board).

SUMMARY OF ILLUSTRATIVE EMBODIMENTS

One embodiment is an apparatus, comprising a first optical input coupler, having first and second input ports and first and second output ports. The optical input coupler can be configured to receive an optical input signal to the first input port. An optical power level ratio of a second optical output to first optical output transmitted from the second and the first output ports, respectively, equals about 2:1.

Some such embodiments include a second optical input coupler having third and fourth input ports and third and fourth output ports. The second optical input coupler can be configured to receive the optical input signal to the third input port. The second optical input coupler can be configured to transmit a third optical output from the third output port to the second input port of the first input coupler. The second optical input coupler can be configured to transmit a fourth optical output from the fourth output port. Optical power level ratio of the fourth optical output to the third optical output, equals about 4:3, respectively Some such embodiments include an optical input switch configured to direct the optical input signal to one of the first input coupler via a first switch port, or, the second input coupler via a second switch port.

Some such embodiments include a third optical input coupler having fifth and sixth input ports and fifth and sixth output ports. The third optical input coupler can be configured to receive the optical input signal to the fifth and sixth input port. The third optical input coupler can be configured to transmit a fifth optical output from the fifth output port to the fourth input port of the second input coupler. The third optical input coupler can be configured to transmit a sixth optical output from the sixth output port. An optical power level ratio of the sixth optical output to the fifth optical output, equals about 8:7.

Some such embodiments further include an optical input switch configured to direct the optical input signal to the third input coupler via a third switch port.

In some such embodiments, the optical input signal is a single carrier wavelength optical signal for wavelength multiplexing.

Some such embodiments further include a data drive module configured to receive the optical output from the input optical coupler and to transmit at least first and second data-modulated optical output signals.

Some such embodiments further include an output apparatus having a first optical output coupler. The first optical output coupler can be configured to receive into second and first input ports, the data-modulated optical second and first output signals, respectively. The first optical output coupler can be configured to transmit, through first and second output ports, respectively, combined first and second output signals, corresponding to the data-modulated optical second and first output signals.

Some such embodiments include an optical output switch configured to transmit the combined second output signal to the optical output switch, and the optical output switch is configured to send the combined second optical output signal, to a switch output port.

In some such embodiments, the output apparatus further includes a second output coupler. The second output coupler can be configured to receive into a third input port, the combined second output signal, and into a fourth input port, a third data-modulated output signal corresponding to the optical output from a second optical input coupler of the apparatus. The second output coupler can be configured to transmit through third and fourth output ports, respectively, combined third and fourth output signals, corresponding to the combined second output signal and the third data-modulated output signal.

In some such embodiments, the output apparatus further includes a third optical output coupler. The third optical output coupler can be configured to receive, into a fifth input port, the combined fourth output signals, and, into a sixth input port a fourth data-modulated output signal corresponding to optical output from a third optical input coupler of the apparatus. The third optical output coupler can be configured to transmit, through fifth and sixth output ports, respectively, combined fifth and sixth output signals, corresponding to the combined fourth output signals, plus the fourth data-modulated output signal.

In some such embodiments, the apparatus further includes two phase shifters each configured to receive one of the data-modulated optical output signals corresponding to the optical output from the first optical input coupler. Some such embodiments further include two variable optical attenuators each configured to receive one of the data-modulated optical output signals after passage through one of the phase shifters. The phase shifters and variable optical attenuators are configured to adjust the data-modulated optical output signals to have an optical power level ratio of about 2:1.

In some such embodiments, the optical input signal received by the first input port includes a first carrier wavelength transmitted from an optical separation filter configured to separate the first carrier wavelength from at least a second carrier wavelength, received in a multicarrier input signal transmitted to the separation filter.

Some such embodiments further include a second optical input coupler having third and fourth input ports and third and fourth output ports. The second optical input coupler can be configured to receive the optical input signal with the second carrier wavelength transmitted from the optical separation filter to the third input port. An optical power level ratio of a fourth optical output to third optical output transmitted from the fourth and third output ports, respectively, equals about 2:1.

Some such embodiments further include an output apparatus having a first optical output coupler. The first optical output coupler can be configured to receive into second and first input ports, data-modulated optical second and first output signals, respectively, that correspond to the second and first optical output from the first optical input coupler, respectively. The second and first optical output includes the first carrier wavelength. The first optical output coupler can be configured to transmit, through first and second output ports, respectively, combined first and second output signals, corresponding to the data-modulated optical first output signal plus the data-modulated optical second output signal. The output apparatus also has a second optical output coupler. The second optical output coupler can be configured to receive into fourth and third input ports, data-modulated optical fourth and third optical signals, respectively, that correspond to the fourth and third optical output from the second optical input coupler, respectively. The fourth and third optical signals include the second carrier wavelength. The second optical output coupler can be configured to transmit, through third and fourth output ports, respectively, combined fourth and third output signals, corresponding to the data-modulated optical third output signal plus the data-modulated optical fourth output signal. The output apparatus also has a third optical output coupler. The third optical output coupler can be configured to receive into fifth and sixth input ports, the combined second output signals, and the combined fourth output signals, respectively. The third optical output coupler can be configured to transmit, through fifth and sixth output ports, respectively, combined data-modulated optical signals of the first and second carrier wavelengths, corresponding to the combined second output signals, plus the combined fourth output signals.

Another embodiment is a system comprising an optical input apparatus, a data drive module and an optical output apparatus. The optical input apparatus includes an optical input coupler having first and second input ports and first and second output ports. The optical input coupler can be configured to receive an optical input signal to the first input port. An optical power level ratio of a second optical output to first optical output transmitted from the second and first output ports, respectively, equals about 2:1. The data drive module can be configured to receive the optical output signals from the optical input coupler, and to transmit data-modulated optical output signals. The optical output apparatus includes an optical output coupler. The optical output coupler can be configured to receive into second and first input ports, the data-modulated optical second and first output signals, respectively. The optical output coupler can be configured to transmit, through first and second output ports, combined first and second output signals, respectively.

Some such embodiments further include an optical input switch configured to receive the optical input signal and to direct the optical input signal to an output switch port of the optical input switch optically coupled to the first input coupler.

Some such embodiments further include an optical output switch configured to receive at least one of the combined first and second output signals and to direct the one combined first and second output signals to an output switch port of the optical output switch.

Some such embodiments further include a control module configured to actuate the optical input switch to direct the optical input signal to an output switch port and actuate the optical output switch to direct the one combined first and second output signals to an output switch port.

In any such embodiments the optical input apparatus can further include second and third optical input couplers configured to receive the optical input signal and form third and fourth optical output signals according to a defined optical splitting format. In some such embodiments the optical output apparatus can further include second and third optical output couplers configured to receive and combine the data-modulated third and fourth optical output signals, respectively according to a mirror image of the defined optical spitting format.

Another embodiment is a method. The method can comprise receiving an optical input signal into a first input port of an optical input coupler. The method can comprise transmitting, through first and second output ports, first and second optical output, wherein an optical power level ratio of the second optical output to the first optical output equals about 2:1. The method can comprise receiving into a data drive module, the first and second optical output. The method can comprise modulating the first and second optical output with a data signal applied by data drive module to form data-modulated first optical output and data-modulated second optical output. The method can comprise receiving into second and first input ports, of an optical output coupler, the data-modulated optical second and first output signals, respectively. The method can comprise transmitting through first and second output ports of the optical output coupler, combined first and second output signals, respectively.

In some such embodiments the optical input signal received by the first input port includes a first carrier wavelength transmitted from an optical separation filter that can be configured to separate the first carrier wavelength from at least a second carrier wavelength, received in a multicarrier input signal transmitted to the optical separation filter.

BRIEF DESCRIPTION OF THE DRAWINGS

Reference is now made to the following descriptions taken in conjunction with the accompanying drawings, in which.

In the Figures and text, similar or like reference symbols indicate elements with similar or the same functions and/or structures.

In the Figures, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION

The description and drawings merely illustrate the principles of the inventions. It will thus be appreciated that those skilled in the art will be able to devise various arrangements that, although not explicitly described or shown herein, embody the principles of the inventions and are included within its scope. Furthermore, all examples recited herein are principally intended expressly to be for pedagogical purposes to aid the reader in understanding the principles of the inventions and concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

One objective is to provide various embodiments that can perform different optical modulation formats using the same optical components. Using common optical components to perform different forms of optical modulation facilitates the use of smaller, more stable, and less expensive integrated apparatus. The disclosed apparatus thereby removes most of the above-mentioned problems associated with the present use of discrete components.

Figure 1:
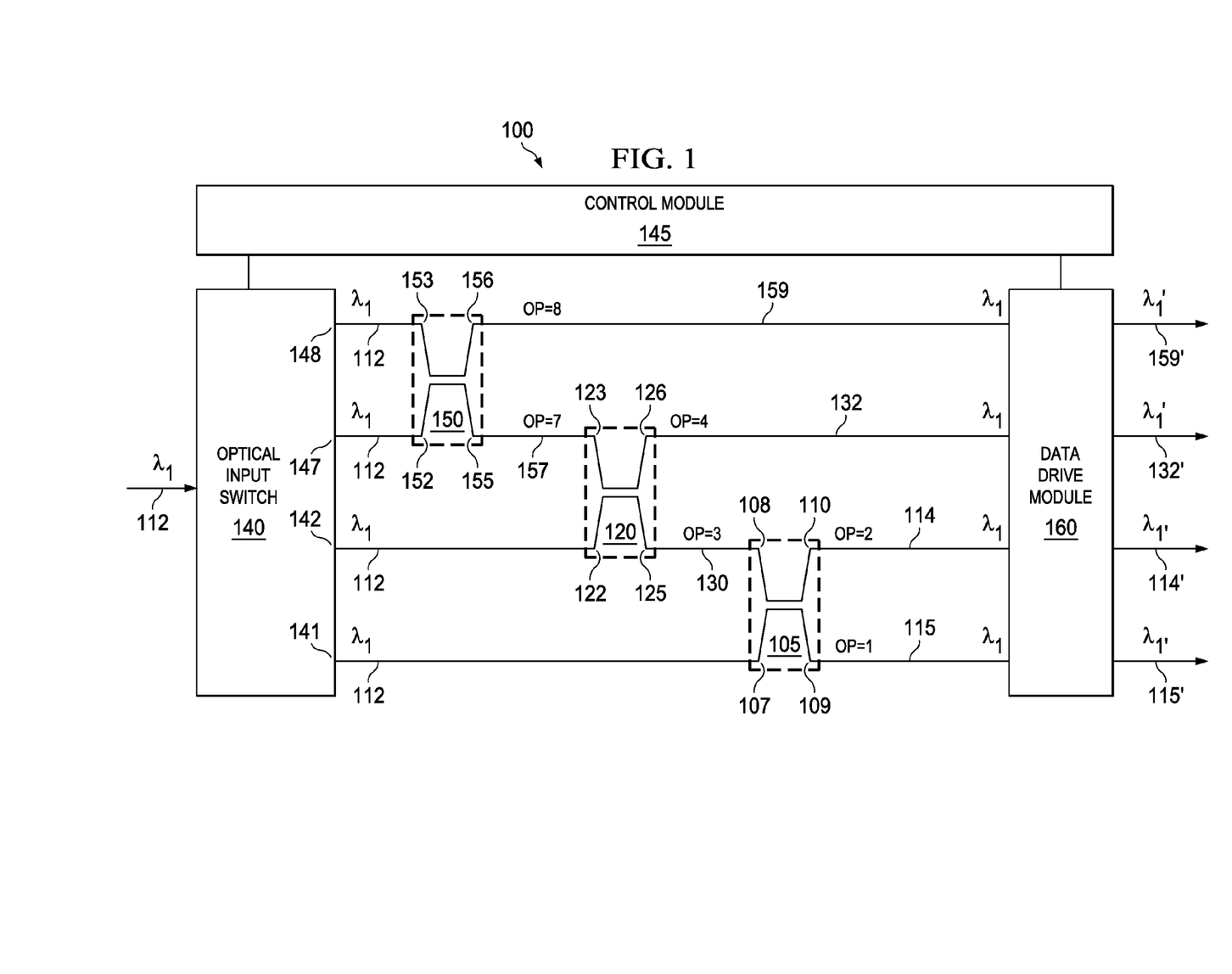
FIG. 1 presents a schematic view of an embodiment of an input components of one embodiment of an apparatus of the disclosure.

FIG. 1 presents a schematic view of an embodiment of an apparatus 100 of the disclosure. In some cases, the apparatus 100 can be or include an input apparatus, e.g., embodied as a planar lightwave circuit (PLCs), e.g., an input PLC. In some cases, components of the apparatus 100 (e.g., the optical couplers and other components coupled to the optical coupler) can integrate components formed on, and in some cases from, the same substrate (e.g., a lithium niobate substrate, silicon substrate or other optical grade semiconductor substrates). As non-limiting examples, in some embodiments the apparatus 100 can be provided on a single substrate as an input PLC occupying an area of about 12×4 mm², about 17×4 mm² or about 15×4 mm².

As illustrated in FIG. 1, the apparatus 100 comprises a first input coupler 105 having first and second input ports 107, 108 and first and second output ports 109, 110. The coupler 105 can be configured to receive an optical input signal 112 to the first input port 107. An optical power level ratio of a second optical output 114 to first optical output 115 transmitted from the second and first output ports 110, 109, respectively, equals about 2:1. For instance, ⅔ of the optical power to import port 107 is transmitted to output port 109 (e.g., a bar state) and ⅓ of the optical power to import port 107 is transmitted to output port 110 (e.g., a cross state). Likewise ⅔ of the optical power to import port 108 is transmitted to output port 110 and ⅓ of the optical power to import port 108 is transmitted to output port 109.

For such an embodiment, the optical input signal 112 includes a single carrier wavelength ($\lambda 1$) for subsequent data modulation, as further described herein (e.g., wavelength multiplexing such as 16-constellation point quadrature amplitude modulated format, abbreviated as 16 QAM herein).

For efficient modulation of the carrier wavelength, it is preferred for the optical coupler 105 to be configured to produce the desired asymmetric optical output power splitting ratios, here about 2:1, and, for a corresponding output optical coupler 205 (FIG. 2), to have a same mirror image of power splitting ratios. Aspects of using such power splitting ratios are discussed in U.S. Pat. No. 7,558,487 to Xiang Liu et al., which is incorporated by reference herein in its entirety. For clarity, the desired relative optical power level output (OP, arbitrary scale) are presented in the figures. The power splitting ratio of about 2:1 provided by the optical coupler 105 (and other power splitting ratios, e.g., about 4:3, about 8:7, provided by other optical couplers, described herein for other embodiments of the apparatus) facilitate the efficient use of the optical input signal 112. For instance, the asymmetric optical output power splitting ratios of the optical couplers can reduce, or may eliminate, the need to attenuate the signal 112 (e.g., with variable optical attenuators) to provide the desired power splitting ratios.

Figure 2:
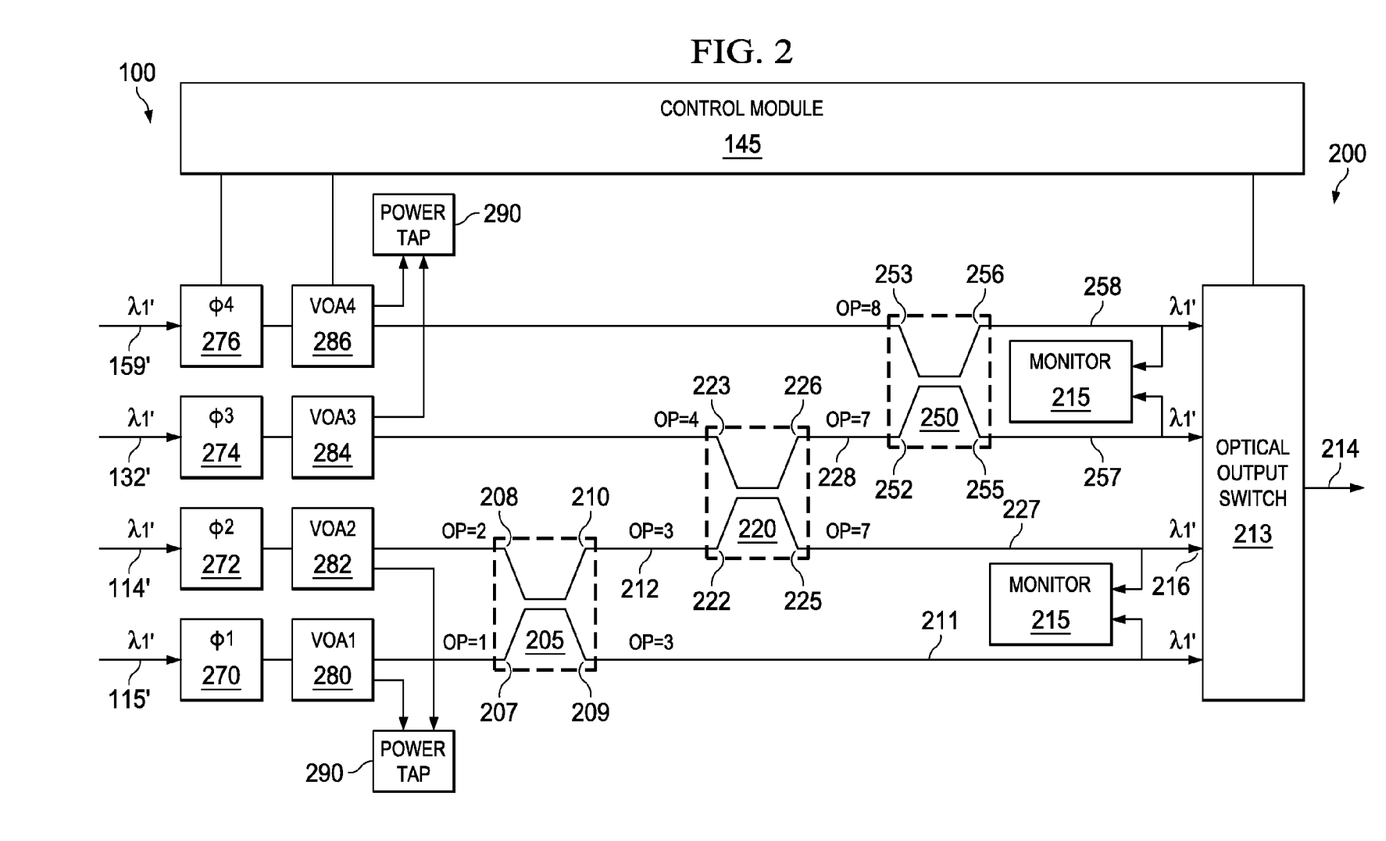
FIG. 2 presents a schematic view of output components of one embodiment of an apparatus of the disclosure.

In some cases, for example, the optical couplers 105, 205 (or additional optical couplers described herein) are constructed to have the designated optical power level ratios within ±10 percent, or more preferably, within ±1 percent tolerances e.g., for the first coupler 105 the optical power level ratio is preferably 2±0.2 and more preferably 2±0.02.

In some embodiments, the optical couplers 105, 205 (or additional optical couplers described herein) can be 2×2 multimode interference (MMI) type optical couplers configured to produce the above-described asymmetric optical power level output ratios. Non-limiting examples of such 2×2 MMI coupler types are described in Tseng et al, Optics Express vol. 15, no. 14 9015-21 2007, or, Besse et al., J. Lightwave Tech. vol. 14, no. 19, 2286-93 1996, both of which are incorporated by reference herein in their entirety.

In some embodiments, the optical couplers 105, 205 (or additional optical couplers described herein) can be 2×2 Mach-Zehnder interferometer (MZI) type optical couplers configured to produce the above-described asymmetric optical power level output ratios. Non-limiting examples of such 2×2 MZI coupler types are described in Henry, et al. in U.S. Pat. No. 5,596,661, which is incorporated by reference herein in its entirety. In some cases the use of MZI type optical couplers may be advantageous because fabrication defects leading to improper power output ratios can readily be compensated for. For instance, in some cases, the couplers 105, 205 can be two-stage or three-stage or higher stage MZI type couplers. For instance, in some cases, by cascading two or more MZI type couplers fabrication defects can be balanced or offset. Additionally, the use of such cascaded MZI type couplers can provide a transmission bandwidth where the transmission passband is relatively flat thereby facilitating the desired power splitting ratios.

To facilitate performing more complex data modulation formats, e.g., a 64 QAM format, additional optical couplers are provided such as shown in FIGS. 1 and 2. For instance, in some embodiments, the apparatus 100 further includes a second input coupler 120 having third and fourth input ports 122, 123 and third and fourth output ports 125, 126. The coupler 120 can be configured to receive the optical input signal 112 to the third input port 122. The coupler 120 can be configured to transmit a third optical output 130 from the third output port 125 to the second input port 108 of the first input coupler 105. The coupler 120 can be configured to transmit a fourth optical output 132 from the fourth output port 126. The optical power level ratio of the fourth optical output 132 to third optical output 130, equals about 4:3, respectively. For instance, 4/7 of the optical power to import port 122 is transmitted to output port 125 (e.g., a bar state) and 3/7 of the optical power to import port 122 is transmitted to output port 126 (e.g., a cross state). Likewise 4/7 of the optical power to import port 123 is transmitted to output port 126 and 3/7 of the optical power to import port 123 is transmitted to output port 125.

Again, for efficient modulation of the carrier wavelength, it is preferred for the optical couplers 105, 120 to produce the desired asymmetric optical output power splitting ratios, and for a corresponding output optical couplers 205, 220 (FIG. 2) to have a same mirror image of power splitting ratios.

As further illustrated in FIG. 1, some embodiments of the apparatus 100 can further include an optical input switch 140 (e.g., an optical space switch) configured to direct the optical input signal 112 to one of the first input coupler 105 via a first switch port 141, or, the second input coupler 120 via a second switch port 142. In some cases, input port 143 switching can be under the control of a control module 145 (e.g., an integrated circuit), receiving instructions sent to the control module as to how the input signal 112 is to be modulated (e.g., 16 QAM or 64 QAM formats).

To facilitate performing even more complex data modulation formats, e.g., 256 QAM, additional optical couplers are provided such as shown in FIGS. 1 and 2. For instance, in some embodiments, the apparatus 100 further includes a third input coupler 150 having fifth and sixth input ports 152, 153 and fifth and sixth output ports 155, 156. The coupler 150 can be configured to receive the optical input signal 112 to the fifth and sixth input ports 152, 153. The coupler 150 can be configured to transmit a fifth optical output 157 from the fifth output port 155 to the fourth input port 123 of the second 2×2 input coupler 120. The coupler 150 can be configured to transmit a sixth optical output 159 from the sixth output port 156. The optical power level ratio of the sixth optical output 159 to the fifth optical output 157 equals about 8:7. For instance, 8/15 of the optical power to import port 152 is transmitted to output port 155 (e.g., a bar state) and 7/15 of the optical power to import port 152 is transmitted to output port 156 (e.g., a cross state). Likewise 8/15 of the optical power to import port 153 is transmitted to output port 156 and 7/15 of the optical power to import port 153 is transmitted to output port 155.

Again, for efficient modulation of the carrier wavelength, it is preferred for the optical couplers 105, 120, 150 to produce the desired asymmetric optical output power splitting ratios, here about 8:7 and for a corresponding output optical couplers 205, 220, 250 (FIG. 2) to have a same mirror image of power splitting ratios.

The optical input switch 140 can be configured to direct (e.g., under the control of the control module 145) the optical input signal 112 to the third input coupler 150 via a third switch port 147, or, equivalently, direct the optical input signal 112 to the third input coupler 150 via a fourth switch port 148. In some cases switch port 148 is preferred when the third input coupler 150 is configured to provide the preferred splitting ratio of about 8:7, thereby possibly avoiding the need for further power adjustments.

As noted above, the optical input signal 112 can be a single carrier wavelength optical signal for one of 16, 64 or 256 quadrature amplitude modulation by a data drive module 160 of the apparatus 100. Without limitation the single carrier wavelength can correspond to any of optical wavelengths used in telecommunications, e.g., C, L, or S optical wavelength bands, or combinations thereof.

In some embodiments, the optical switch 140 can control which modulation format the optical input signal 112 is subjected to by directing the input signal 112 to a particular one of the optical couplers 105, 120, 150.

For example, in some cases, the input optical switch 140 sends the optical input signal 112, via the first switch port 141, to the first input port 107 of the first input coupler 105. The subsequent second optical output 114 and first optical output 115, with optical power level ratio of about 2:1, are sent to the data drive module 160 for subsequent data modulation (e.g., in a 16 QAM format). For example, in other cases, the input optical switch 140 sends the optical input signal 112, via the second switch port 142, to the first input port 122 of the second input coupler 120. The subsequent fourth optical output 132, second optical output 114 and first optical output 115 are sent to the data drive module 160 subsequent data modulation (e.g., in a 64 QAM format). For example, in still other cases, the input optical switch 140 sends the optical input signal 112, via the third or fourth switch port 147, 148, to the fifth or sixth input port 152, 153 of the third input coupler 150. The subsequent sixth optical output 159, fourth optical output 132, second optical output 114 and first optical output 115, with power ratios of 8:4:2:1, are sent to the data drive module 160 for subsequent data modulation (e.g., in a 256 QAM format).

Some embodiments further include the data drive module 160. One skilled in the pertinent arts would be familiar with the procedures to encode data (e.g. binary data) into the carrier wavelengths in the optical output 114, 115, 132 159 (referred to herein as data-modulated output signals 114', 115', 132', 159') received from the one or more optical couplers 105, 120, 150 of the apparatus 100. Non-limiting examples of such procedures include, binary phase shift keying or on-off keying, quadrature phase-shift keying, or other keying protocols familiar to those skilled in the pertinent arts.

The data drive module 160 can be configured to receive the optical output 114, 115 from the input optical coupler 105, or additional output 132, 159 from the second and third input optical couplers 120, 150. The data drive module 160 can be further configured to transmit the data-modulated output signals, e.g., signals 114' and 115' and additionally, in some cases, data-modulated output signals 132', 159'.

As illustrated in FIG. 2 some embodiments of the apparatus 100 include an output apparatus 200. In some cases the output apparatus 200 can be embodied as a PLC e.g., an output PLC.

The output apparatus 200 can include the one or more of the output optical couplers 205, 220, 250. The data drive module 160 can be configured to transmit the data-modulated output signals 114', 115', 132', 159' to the output optical couplers 205, 220, 250 corresponding to the input optical couplers 105, 120, 150, respectively.

In some embodiments for instance, the output apparatus 200 includes a first optical output coupler 205. The output coupler 205 can be configured to receive, into second and first input ports 208, 207, the data-modulated optical second and first output signals 114', 115' (e.g., according to a 16 QAM format). The output coupler 205 can be configured to transmit, through first and second output ports 209, 210, respectively, combined first and second output signals 211, 212, corresponding to the data-modulated optical second and first output signals 114', 115'. For instance, 1/3 of the input power will cross over to the opposite output when moving from the input to the output ports of the first output coupler 205 and ⅔ of the power will move straight (e.g., a bar state).

One skilled in the pertinent art would understand that the combined output signals 211, 212 carry the same data content but in a complementary format. As a non-limiting example, while the signal 211 may carry a string of binary data encodes as: 1, 1, 0, 1, the signal 212 carries a string of binary data encodes as: 0, 0, 1, 0. One skilled in the pertinent art would understand how, for modulation formats with additional constellation points, the complementary format has to be computed by appropriately taking into account both amplitudes and phases of the signals.

As further illustrated in FIG. 2, in some embodiments the apparatus 100, e.g., the output apparatus 200, further includes an optical output switch 213 (e.g., an optical space switch). In some embodiments, the combined second output signal 212, can be transmitted to the optical output switch 213, and the optical output switch 213 can be configured to send the combined second optical output signal 212, to a switch output port 214. For instance, the optical switch 213, e.g., under the control of the control module 145, can be actuated to receive the combined second optical output signal 212 via a first input switch port 216.

In some such embodiments, the combined first output signal 211 can be transmitted to an optical monitor module 215. The optical monitor module 215 can be any device, familiar to one skilled in the pertinent arts, configured to measure optical output (e.g., wavelength, phase, amplitude or optical power level) and transmit such information to the control module 145. The control module 145, in turn, can be configured to send instructions to other components of the apparatus (e.g., phase shifters and/or variable optical amplifiers) that cause an adjustment or balancing of the data-modulated optical output signals 114', 115', to provide the desired optical power level ratios. In other embodiments, equivalently, the combined first output signal 211 can be transmitted to the optical output switch 213 and the combined second output signal 212 can be transmitted to the optical monitor module 215.

As further illustrated in FIG. 2, when performing more complex data modulation formats, e.g., a 64 QAM format, the output apparatus 200 can further include the second output coupler 220. The second output coupler 220 can be configured to receive into a third input port 222, the combined second output signal 212. The second output coupler 220 can be configured to receive into a fourth input port 223, a third data-modulated output signal 132' corresponding to optical output 132 from a second optical input coupler 120 of the apparatus 100 (e.g., input apparatus). The second output coupler 220 can be configured to transmit, through third and fourth output ports 225, 226, respectively, combined third and fourth output signals 227, 228, corresponding to the combined second output signal 212, plus the third data-modulated output signal 132'. For instance 4/7 of the input power (e.g., input port 222) will be transmitted to the opposite output port 225 (e.g., a bar state), and, 3/7 of the power will be transmitted to the output port 226 (e.g., a cross state).

As further illustrated in FIG. 2, when performing even more complex data modulation formats, e.g., a 256 QAM format, the output apparatus 200 can further include the third optical output coupler 250. The third output coupler 250 can be configured to receive, into a fifth input port 252, the combined fourth output signals 228. The third output coupler 250 can be configured to receive, into a sixth input port 253 a fourth data-modulated output signal 159' corresponding to optical output 159 from a third optical input coupler 150 of the apparatus 100 (e.g., input apparatus). The third output coupler 250 can be configured to transmit, through fifth and sixth output ports 255, 256, respectively, combined fifth and sixth output signals 257, 258, corresponding to the combined fourth output signals 228, plus the fourth data-modulated output signal 159'. For instance, 8/15 of the optical power to import port 252 is transmitted to output port 255 (e.g., a bar state) and 7/15 of the optical power to import port 252 is transmitted to output port 256 (e.g., a cross state).

As further illustrated in FIG. 2, in embodiments of the apparatus 100, e.g., output apparatus 200 including the optical output switch 213 the combined fourth or sixth output signals 228, 258 can be transmitted to an optical output switch 213 (e.g., ports 260, 261 respectively). The optical output switch 213, in turn, can be configured to transmit the combined fourth or sixth optical output signal 228, 258 to the switch output port 214. As further illustrated, in some embodiments, the combined third or fifth output signal 227, 257 can be transmitted to one or more optical monitor modules 215. In alternative equivalent embodiments, the combined fourth or sixth output signals 228, 258 can be transmitted to the optical monitor modules 215, and, the combined third or fifth output signal 227, 257 can be transmitted to the optical output switch 213.

As also illustrated in FIG. 2, some embodiments of the apparatus 100, e.g., the output apparatus 200 further include two or more phase shifters (Φ) 270, 272, 274, 276 and two or more variable optical attenuators (VOAs) 280, 282, 284, 286. As further illustrated, the power taps 290 (which in some cases, can be configured as intermediate signal monitors) can be coupled to the variable optical attenuators 280-286. In some embodiments, the variable optical attenuators can be or include Mach-Zehnder filters under thermo-optical control as well known to those skilled in the pertinent arts. The phase shifters and variable optical attenuators facilitate rebalancing of the phases and amplitudes of data-modulated signals 114', 115', 132', 159', e.g., due to fabrication imperfections in the devices of the date-drive module 160, or, deviations from the preferred values of the optical power splitting ratios of the input couplers 105, 120, 150.

The first and second phase shifters 270, 272 (and in some cases, third and forth phase shifters 274, 276) can be configured to receive one of the data-modulated optical output signals 114' 115' (and in some cases, signals 132', 159') corresponding to the optical output 114, 115 (and in some cases, outputs 132, 159) from the optical input coupler 105 (and in some cases, input couplers 120, 150).

The first and second variable optical attenuators 280, 282 (and in some cases, variable optical attenuators 284, 286) can be configured to receive one of the data-modulated optical output signals 114', 115', e.g., after passage through one of the phase shifters 270, 272 (and in some cases phase shifters 274, 276). The phase shifters and the variable optical attenuators are configured (e.g., based on instructions from the control module 145) to adjust the data-modulated optical output signals 114' 115' optical power level ratios of about 2:1. Likewise, in other embodiments, the date modulated signals 132', 159' can be adjusted by additional phase shifters 274, 276 and variable optical attenuators 284, 286 to provide the preferred optical power level ratios, e.g., of about 4:3 and about 8:7.

Figure 3:
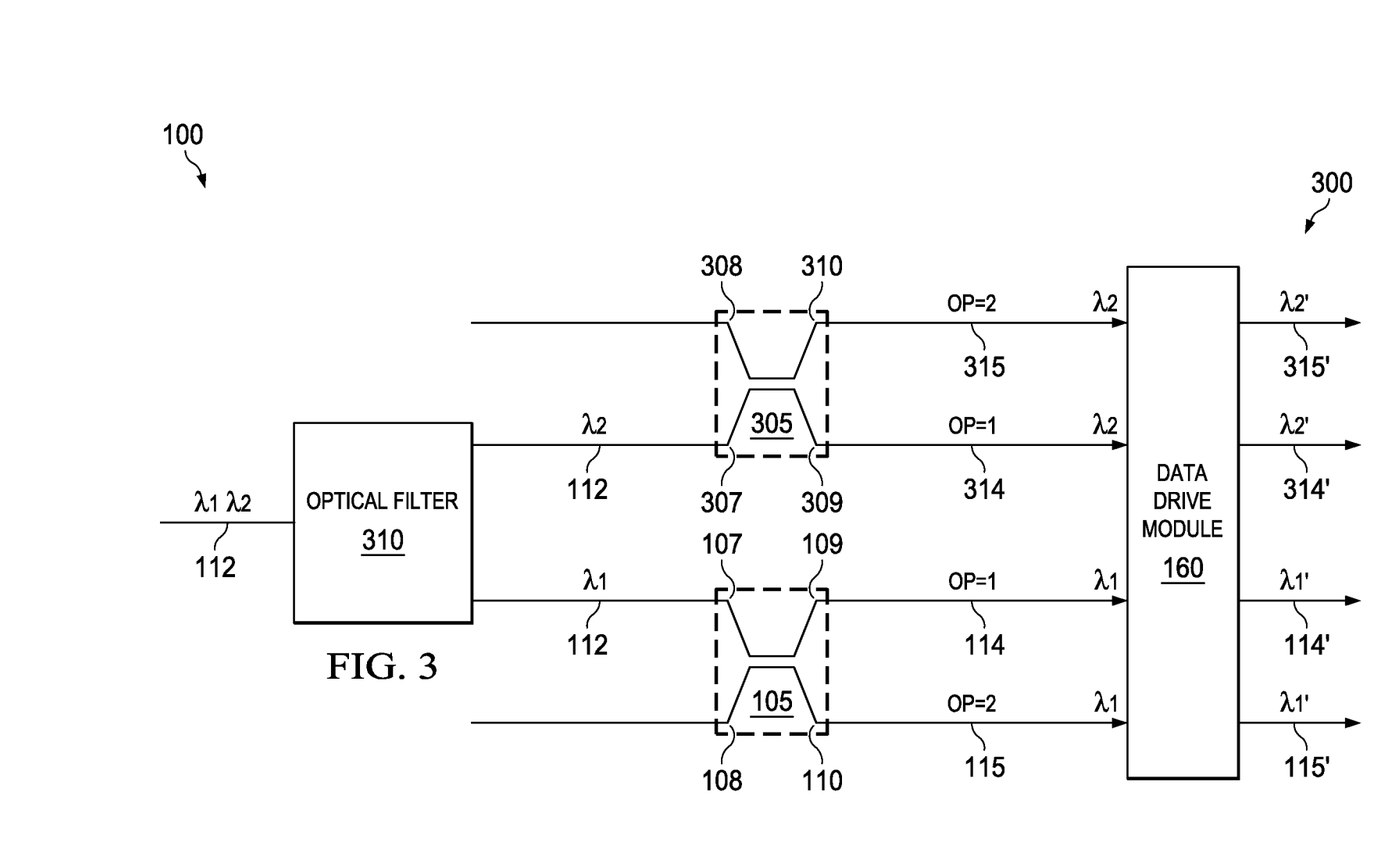
FIG. 3 presents a schematic view of input components of another embodiment of an apparatus of the disclosure.

FIG. 3 presents a schematic view of input components of another embodiment of the apparatus 100. In some cases, the apparatus 100 can be or include an input apparatus 300, e.g., an input PLC. As illustrated, the optical input signal 112 received by the first input port 107 includes a first carrier wavelength λ1 transmitted from an optical separation filter 310 configured to separate the first carrier wavelength λ1 from at least a second carrier wavelength λ2, received in a multicarrier input signal 315 transmitted to the separation filter 310

In some embodiments, the optical separation filter 310 can include single-stage or multi-stage stage Mach-Zehnder filter such as described in the '145 application.

As discussed in the context of FIG. 1, the second and first optical output 114, 115 of the input apparatus 300 can have optical power level ratio of about 2:1, and this output can be transmitted to the data drive module 160 for data modulation (e.g., in a 16 QAM format).

As further illustrated in FIG. 3, the input apparatus 300 further includes a second optical input coupler 305 having third and fourth input ports 307, 308 and third and fourth output ports 309, 310. The second optical input coupler 305 can be configured to receive the optical input signal 112 with the second carrier wavelength λ2 transmitted from the optical separation filter 310 to the third input port 307. An optical power level ratio of a fourth optical output 314 to third optical output 315 transmitted from the fourth and third output ports 310, 309, respectively, equals about 2:1.

The fourth and third optical output 314, 315, having the optical power level ratio of about 2:1, can be transmitted to the data drive module 160 for wavelength multiplexing (e.g., in a 16 QAM format), independent of the wavelength multiplexing of the first carrier wavelength λ1 transmitted to the data drive module 160 by the first optical input coupler 105.

Figure 4:
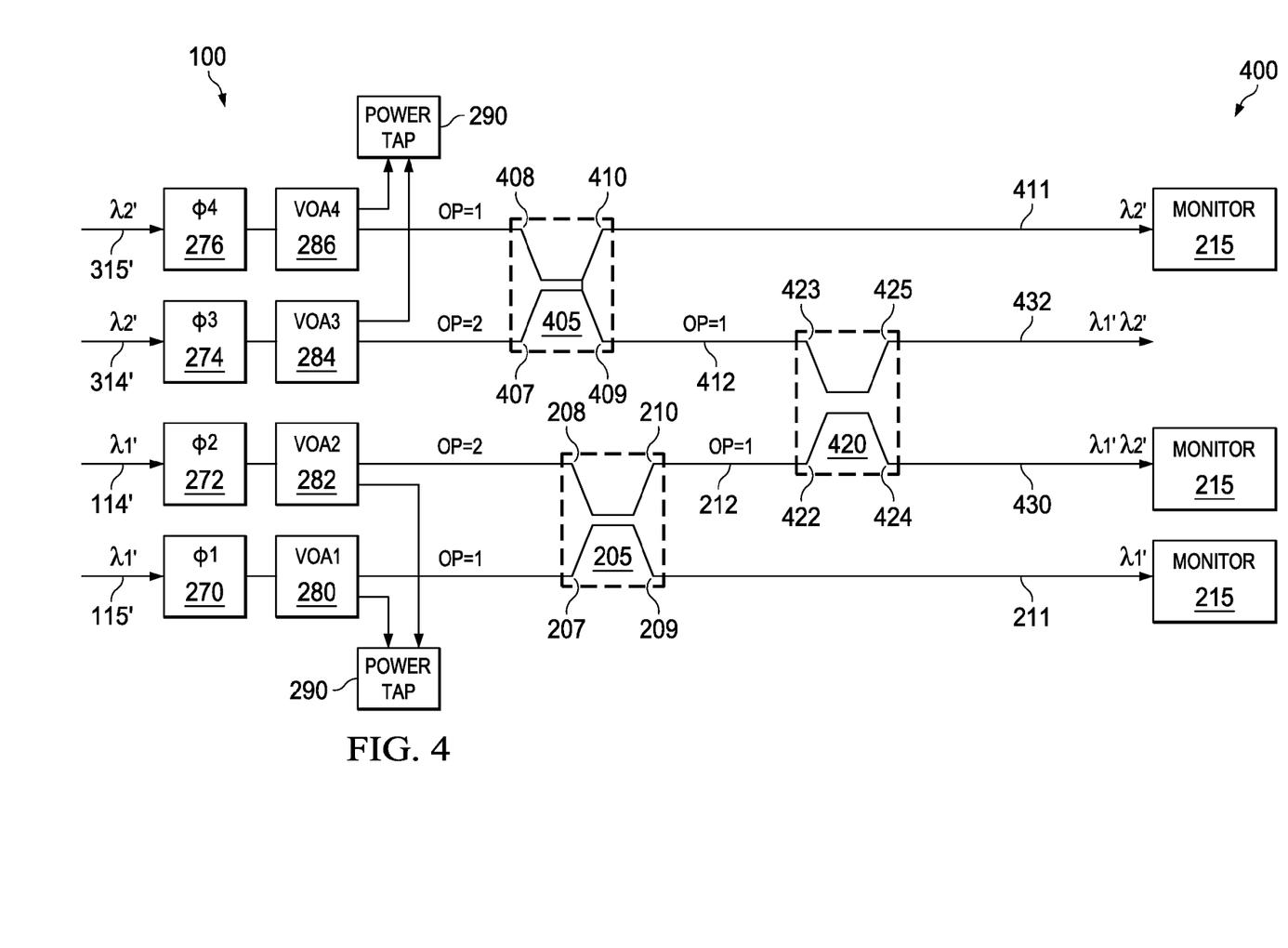
FIG. 4 presents a schematic view of output components of another embodiment of an apparatus of the disclosure.

FIG. 4 presents another embodiment of the apparatus 100 of the disclosure. In some cases, the apparatus 100 include output apparatus 400, which can e.g., be configured as an output PLC. The apparatus 400 has the first optical output coupler 205 such as described in FIG. 2, and a similarly configured second optical output coupler 405.

The first optical output coupler 205 can be configured to receive into second and first input ports 208, 207, data-modulated optical second and first output signals 114', 115', respectively. The second and first output signals 114', 115', correspond to the second and first optical output 114, 115 from the first optical input coupler, respectively. The second and first optical output 114, 115 includes the first carrier wavelength λ1. The first optical output coupler 205 can be configured to transmit through first and second output ports 209, 210, respectively. The first optical output coupler 205 can be configured to output combined first and second output signals 211, 212, corresponding to the data-modulated optical first output signal 115' plus the data-modulated optical second output signal 114'. The optical power level ratios of the combined second output signals 212 to the second data-modulated optical output signal 114' to the first data-modulated optical output signal 115' are equal to 1:2:1, respectively.

The second optical output coupler 405 can be configured to receive, into fourth and third input ports 408, 407, data-modulated optical fourth and third optical signals 314', 315', respectively. The fourth and third optical signals 314', 315' correspond to the fourth and third optical output 314, 315 from the second optical input coupler 305, respectively. The fourth and third optical signals 314', 315' include the second carrier wavelength λ2. The second optical output coupler 405 can be configured to transmit, through third and fourth output ports 409, 410, respectively, combined fourth and third output signals 411, 412, corresponding to the data-modulated optical third output signal 415' plus the data-modulated optical fourth output signal 414'.

The output apparatus 400 also has a third optical output coupler 420. The third optical output coupler 420 can be configured to receive into fifth and sixth input ports 422, 423, the combined second output signals 212, and the combined fourth output signals 412, respectively. The third optical output coupler 420 can be configured to transmit, through fifth and sixth output ports 424, 425, respectively, combined data-modulated optical signals 430, 432 of the first and second carrier wavelengths λ1, λ2, corresponding to the combined second output signals 212, plus the combined fourth output signals 412.

In some embodiments, the combined 2-carrier data-modulated optical signals 432 from the sixth output port 425 can be the optical output transmitted from the apparatus 400. In some such cases, the 2-carrier data-modulated optical signals 430 from the fifth output port 424 can be transmitted to an optical monitor module 215, to perform the same functions described in the context of FIG. 2. In some embodiments the likewise, single carrier signals 211, 411, can be transmitted to an optical monitor module 215 for similar purposes. Some embodiments of the third output coupler 420 can also take the form of a power combiner or a wavelength multiplexer.

In still other embodiments, the 2-carrier data-modulated optical signals 430 from the fifth output port 424, which contains the same but complementary information as the signals 432, can be the optical output transmitted from the apparatus 400. In some such cases the 2-carrier data-modulated optical signals 432 can be transmitted to an optical monitor module 215.

As illustrated in FIG. 4, the apparatus 400 can further include phase shifters 270-276 and variable optical attenuators 280-286, and power taps 290 configured similar to the apparatus 200 described in FIG. 2.

Figure 5:
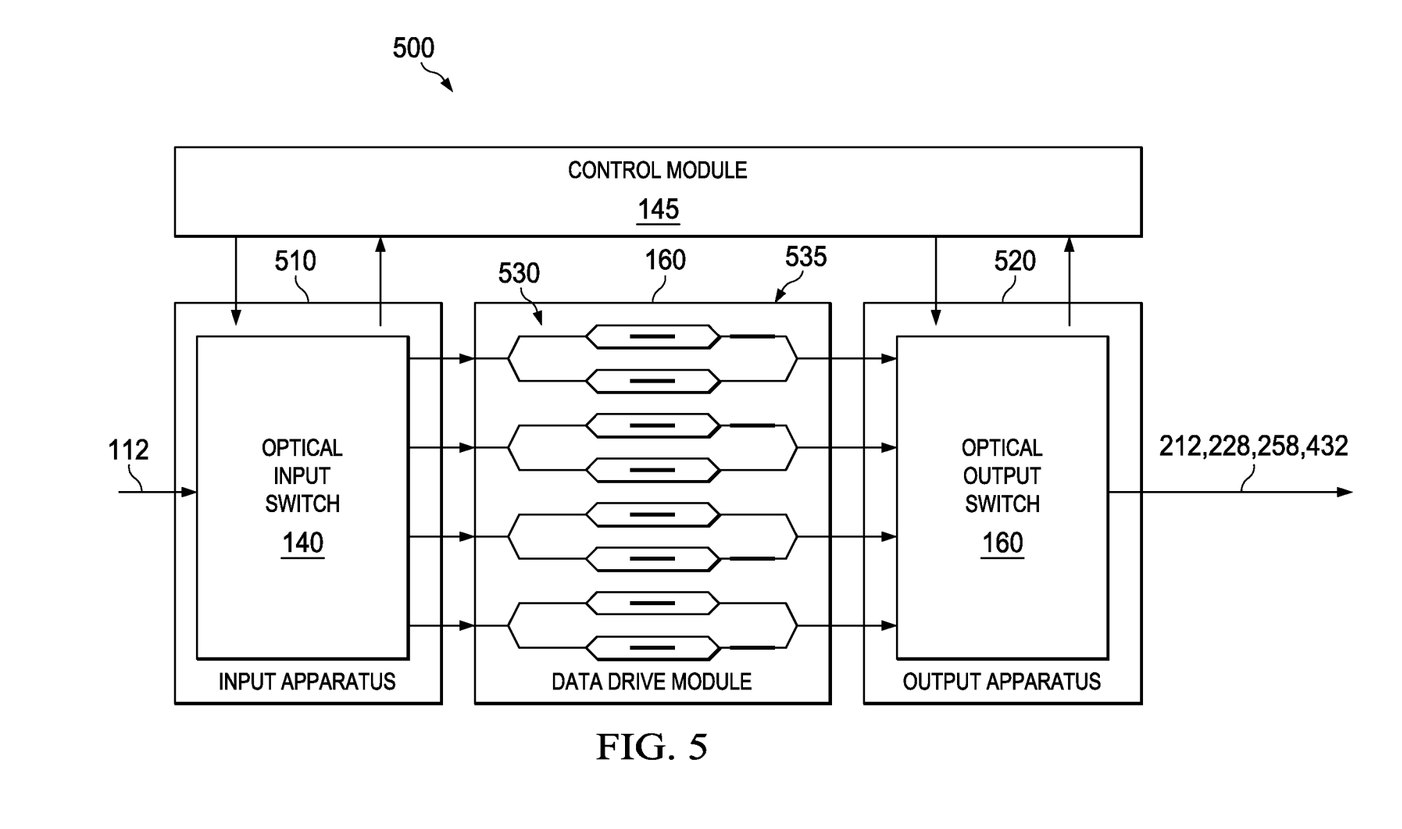
FIG. 5 presents a block diagram of a system of the disclosure that includes the apparatus of the disclosure, such as any of the apparatuses depicted in FIGS. 1-4.

Another embodiment of the disclosure is a system, e.g., an optical communication system. FIG. 5 presents a block diagram of a system 500 of the disclosure that includes the apparatus of the disclosure, such as any of the apparatuses depicted in FIGS. 1-4. For instance, in some embodiments the system 500 can include an optical input apparatus 510 (e.g., any embodiments of apparatus 100 or apparatus 300), a data drive module 160 and an optical output apparatus 520 (e.g., any embodiments of apparatus 200 or apparatus 400).

With continuing reference to FIGS. 1 and 2, the optical input apparatus 510 of the system 500 shown in FIG. 5 can include the first input coupler 105 having first and second input ports 107, 108 and first and second output ports 109, 110. The input coupler 105 can be configured to receive an optical input signal 112 to the first input port 107. An optical power level ratio of a second optical output 114 to first optical output 115 transmitted from the second and first output ports 110, 109, respectively, equals about 2:1.

The data drive module 160 of the system 500 can be configured to receive the optical output signals 114, 115 from the input coupler 105, and to transmit data-modulated optical output signals 114', 115'. As a non-limiting example, the data drive module 160 of the system 500 can include arrays of nested Mach-Zehnder modulators 530, e.g., fabricated on a lithium niobate substrate 535 or other optical grade substrates. In some embodiments the data drive module 160 is a lithium niobate optical chip.

The optical output apparatus 520 of the system 500 has an optical output coupler 205 configured to receive into second and first input ports 208, 207, the data-modulated optical second and first output signals 114', 115', respectively. The an optical output coupler 205 can be configured to transmit through first and second output ports 209, 210, combined first and second output signals 211, 212, respectively.

Based upon the present disclosure, one skilled in the pertinent art would understand how the system 500 could be expanded to include additional input and output couplers such as discussed in the context of FIGS. 1-4, to perform additional wavelength multiplexing formats on single, dual or higher wavelength carriers included in the optical input 112. For instance, the optical input apparatus 510 can further include second and third optical input couplers 120, 150 configured to receive the optical input signal 112 and form the third and fourth optical output signals, 132, 159 according to a defined optical splitting format. The optical output apparatus 520 can further include second and third optical output couplers 220, 250 configured to receive and combine the third and fourth data-modulated output signals 132', 159' according to a mirror image of the defined optical spitting format (e.g., about 4:3 or 8:7).

As further illustrated in FIG. 5 some embodiments of the system 500 can further include one or more of an optical input switch 140, an optical output switch 160 and a control module 145, configured as described for any the embodiments discussed in the context of FIGS. 1-4.

For example, with continuing reference to FIGS. 1-4, the optical input switch 140 can be configured to receive the optical input signal 112 and to direct the optical input signal 112 to an output switch port 141 of the optical input switch 140 optically coupled to the first input coupler 105. The optical output switch 160 can be configured to receive at least one of the combined first and second output signals 211, 212 and to direct the one combined first and second output signals 211, 212 to an output switch port 214 of the optical output switch 160. The control module 145 can be configured to actuate the optical input switch 140 to direct the optical input signal 112 to an output switch port 141 and actuate the optical output switch 160 to direct the one combined first and second output signals 211, 212 to an output switch port 214 to facilitate the transmission of a particular data modulation format (e.g., a 16 QAM format).

Figure 6:
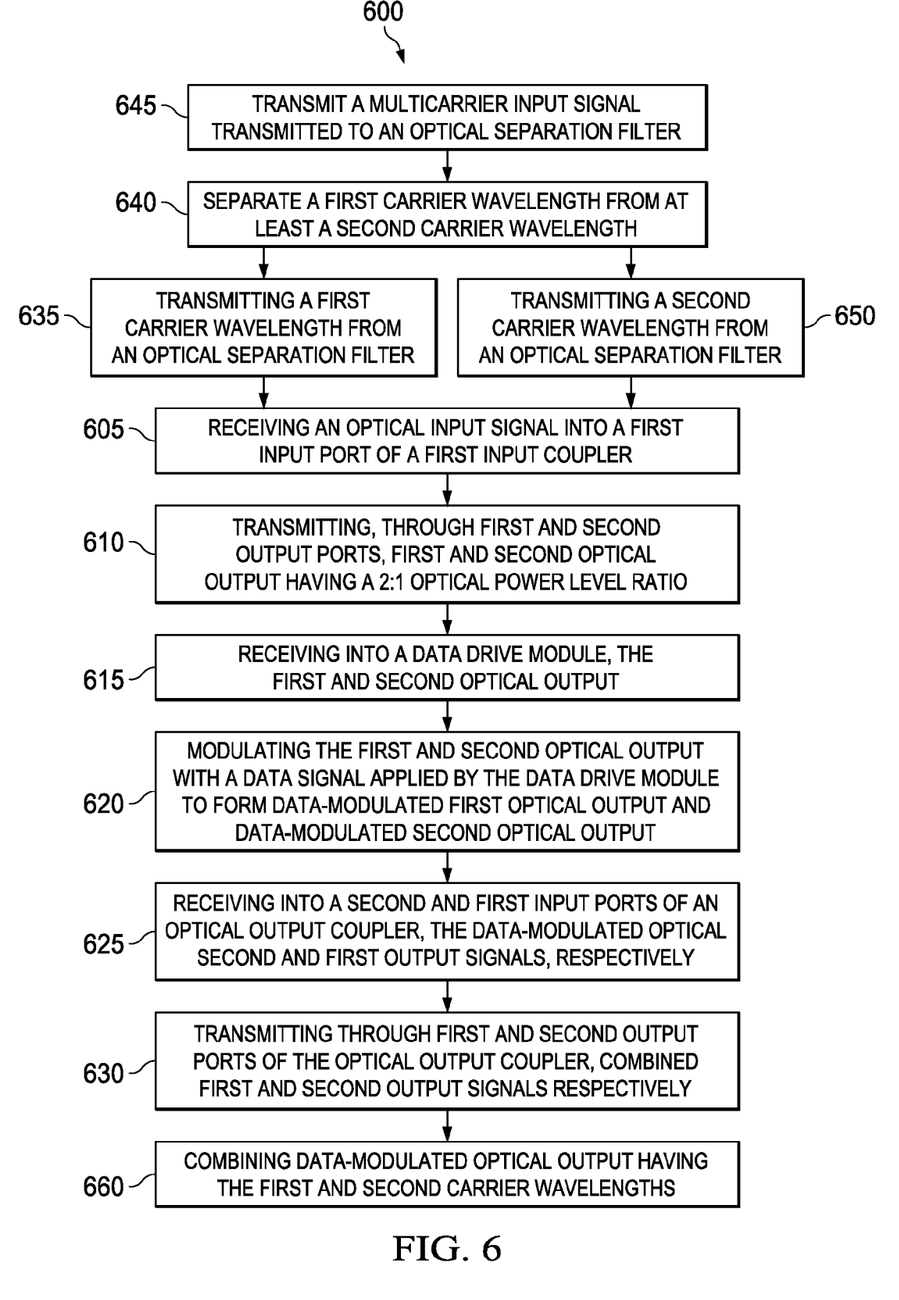
FIG. 6 presents a flow diagram illustrating a method of the disclosure, e.g., a method using any embodiments of the apparatuses or systems discussed in the context of FIGS. 1-5.

Another embodiment is a method. FIG. 6 presents a flow diagram illustrating a method of the disclosure, e.g., a method using any embodiments of the apparatus 100 or system 500 discussed in the context of FIGS. 1-5 for data modulation.

With continuing reference to FIGS. 1-5, embodiments of the method 600 can comprise a step 605 of receiving an optical input signal 112 into a first input port 107 of a first input coupler 105. The method can further comprise a step 610 of transmitting, through first and second output ports 109, 110, first and second optical output 115, 114, wherein an optical power level ratio of the second optical output 114 to the first optical output 115 equals about 2:1. The method can comprise a step 615 of receiving into a data drive module 160, the first and second optical output 115, 114. The method can comprise a step 620 of modulating the first and second optical output 115, 114 with a data signal applied by the data drive module 160 to form data-modulated first optical output 115' and data-modulated second optical output 114'. The method can comprise a step 625 of receiving into second and first input ports 208, 207, of an optical output coupler 205, the data-modulated optical second and first output signals 114', 115', respectively. The method can comprise a step 630 of transmitting through first and second output ports 209, 210 of the optical output coupler 205, combined first and second output signals 211, 212, respectively.

One skilled in the pertinent arts would understand based upon the present disclosure how the method 600 can part of various data modulation formats applied the optical input signal 112 (such as 16 QAM, 64 QAM or 256 QAM formats) by selecting the appropriate combinations of input and output couplers such as discussed herein.

One skilled in the pertinent arts would understand how the method 600 can be applied as part of wavelength multiplexing of dual-carriers wavelengths of the optical input signal 112. For instance, in some embodiments, the optical input signal 112 received by the first input port 107 can include a first carrier wavelength λ1 transmitted, in step 635, from an optical separation filter 310 configured, in step 640, to separate the first carrier wavelength λ1 from at least a second carrier wavelength λ2, in a multicarrier input signal 112 transmitted to the optical separation filter 310 in step 645. In similar fashion, the second carrier wavelength λ2 could be the optical input 112 transmitted in step 650 to the input optical coupler 105, or, another input optical coupler 305 and processed the same way as described for the input optical signal 112 described in steps 605-630. In step 660, data-modulated optical output having the first and second carrier wavelengths can be combined. For instance, as part of step 660, the combined second output signal 212 having the first carrier wavelength λ1 could be combined with the combined second output signal 412 having the second carrier wavelength λ2 to thereby produce the combined data-modulated optical signal 432 having the first and second carrier wavelengths λ1, λ2.

Those skilled in the art to which this application relates will appreciate that other and further additions, deletions, substitutions and modifications may be made to the described embodiments.

What is claimed is:

1. An apparatus, comprising:
a first optical input coupler, having first and second input ports and first and second output ports, and configured to receive an optical input signal to the first input port, wherein an optical power level ratio of a second optical output to first optical output transmitted from the second and the first output ports, respectively, equals about 2:1;
a second optical input coupler having third and fourth input ports and third and fourth output ports, and configured to receive the optical input signal to the third input port and transmit a third optical output from the third output port to the second input port of the first input coupler, and transmit a fourth optical output from the fourth output port, wherein optical power level ratio of the fourth optical output to the third optical output, equals about 4:3, respectively; and
a third optical input coupler having fifth and sixth input ports and fifth and sixth output ports, and configured to receive the optical input signal to the fifth input port, and, transmit a fifth optical output from the fifth output port to the fourth input port of the second input coupler and transmit a sixth optical output from the sixth output port, wherein an optical power level ratio of the sixth optical output to the fifth optical output, equals about 8:7.

2. The apparatus of claim 1, further including an optical input switch configured to direct the optical input signal to one of the first input coupler via a first switch port, or, the second input coupler via a second switch port.

3. The apparatus of claim 1, further including an optical input switch configured to direct the optical input signal to the third input coupler via a third switch port.

4. The apparatus of claim 1, wherein the optical input signal is a single carrier wavelength optical signal for wavelength multiplexing.

5. The apparatus of claim 1, further including a data drive module configured to receive the optical output from the input optical coupler, and to transmit at least first and second data-modulated optical output signals.

6. The apparatus of claim 5, further including an output apparatus having a first optical output coupler configured to:

receive into second and first input ports, the data-modulated optical second and first output signals, respectively, and transmit, through first and second output ports, respectively, combined first and second output signals, corresponding to the data-modulated optical second and first output signals.

7. The apparatus of claim 6, further including an optical output switch configured to transmit the combined second output signal to the optical output switch, and the optical output switch is configured to send the combined second optical output signal, to a switch output port.

8. The apparatus of claim 6, wherein the output apparatus further includes a second output coupler configured to:
receive into a third input port, the combined second output signal, and into a fourth input port, a third data-modulated output signal corresponding to the optical output from a second optical input coupler of the apparatus, and
transmit through third and fourth output ports, respectively, combined third and fourth output signals, corresponding to the combined second output signal and the third data-modulated output signal.

9. The apparatus of claim 5, further including:
two phase shifters each configured to receive one of the first and second data-modulated optical output signals corresponding to the optical output from the first optical input coupler; and
two variable optical attenuators each configured to receive one of the data-modulated optical output signals after passage through one of the phase shifters, wherein the phase shifters and variable optical attenuators are configured to adjust the data-modulated optical output signals to have an optical power level ratio of about 2:1.

10. The apparatus of claim 1, wherein the optical input signal received by the first input port includes a first carrier wavelength transmitted from an optical separation filter configured to separate the first carrier wavelength from at least a second carrier wavelength, received in a multicarrier input signal transmitted to the separation filter.

11. An apparatus, comprising:
a first optical input coupler, having first and second input ports and first and second output ports, and configured to receive an optical input signal to the first input port, wherein an optical power level ratio of a second optical output to first optical output transmitted from the second and the first output ports, respectively, equals about 2:1;
a data drive module configured to receive the optical output from the input optical coupler, and to transmit at least first and second data-modulated optical output signals;
an output apparatus having a first optical output coupler configured to:
receive into second and first input ports, the data-modulated optical second and first output signals, respectively, and
transmit, through first and second output ports, respectively, combined first and second output signals, corresponding to the data-modulated optical second and first output signals; and
an optical output switch configured to transmit the combined second output signal to the optical output switch, and the optical output switch is configured to send the combined second optical output signal, to a switch output port, wherein the output apparatus further includes a second output coupler configured to:
receive into a third input port, the combined second output signal, and into a fourth input port, a third data-modulated output signal corresponding to the optical output from a second optical input coupler of the apparatus,
transmit through third and fourth output ports, respectively, combined third and fourth output signals, corresponding to the combined second output signal and the third data-modulated output signal,
receive, into a fifth input port, the combined fourth output signals, and, into a sixth input port a fourth data-modulated output signal corresponding to optical output from a third optical input coupler of the apparatus, and
transmit, through fifth and sixth output ports, respectively, combined fifth and sixth output signals, corresponding to the combined fourth output signals, plus the fourth data-modulated output signal.

12. An apparatus, comprising:
a first optical input coupler, having first and second input ports and first and second output ports, and configured to receive an optical input signal to the first input port, wherein an optical power level ratio of a second optical output to first optical output transmitted from the second and the first output ports, respectively, equals about 2:1, wherein the optical input signal received by the first input port includes a first carrier wavelength transmitted from an optical separation filter configured to separate the first carrier wavelength from at least a second carrier wavelength, received in a multicarrier input signal transmitted to the separation filter; and
an output apparatus having:
a first optical output coupler configured to:
receive into second and first input ports, data-modulated optical second and first output signals from a data drive module, respectively, that correspond to the second and first optical output from the first optical input coupler received into the data drive module, respectively, wherein the second and first optical output includes the first carrier wavelength, and
transmit, through first and second output ports, respectively, combined first and second output signals, corresponding to the data-modulated optical first output signal plus the data-modulated optical second output signal;
a second optical output coupler configured to:
receive into fourth and third input ports, data-modulated optical fourth and third optical signals from the data drive module, respectively, that correspond to the fourth and third optical output from the second optical input coupler received into the data drive module, respectively, wherein fourth and third optical signals include the second carrier wavelength, and
transmit, through third and fourth output ports, respectively, combined fourth and third output signals, corresponding to the data-modulated optical third output signal plus the data-modulated optical fourth output signal; and
a third optical output coupler configured to:
receive into fifth and sixth input ports, the combined second output signals, and the combined fourth output signals, respectively, and
transmit, through fifth and sixth output ports, respectively, combined data-modulated optical signals of the first and second carrier wavelengths, corresponding to the combined second output signals, plus the combined fourth output signals.

13. The apparatus of claim 12, further including:
a second optical input coupler having third and fourth input ports and third and fourth output ports, and configured to receive the optical input signal with the second carrier wavelength transmitted from the optical separation filter to the third input port, wherein an optical power level ratio of a fourth optical output to third optical output transmitted from the fourth and third output ports, respectively, equals about 2:1.

* * * * *